United States Patent
Quell

(10) Patent No.: US 9,745,961 B2
(45) Date of Patent: Aug. 29, 2017

(54) OFFSHORE WIND FARM ILLUMINATION

(75) Inventor: Peter Quell, Osterrönfeld (DE)

(73) Assignee: SENVION SE, Hamburg (DE)

( * ) Notice: Subject to any disclaimer, the term of this patent is extended or adjusted under 35 U.S.C. 154(b) by 1193 days.

(21) Appl. No.: 13/825,318

(22) PCT Filed: Sep. 12, 2011

(86) PCT No.: PCT/EP2011/065791
§ 371 (c)(1),
(2), (4) Date: Jul. 29, 2014

(87) PCT Pub. No.: WO2012/038296
PCT Pub. Date: Mar. 29, 2012

(65) Prior Publication Data
US 2014/0377060 A1 Dec. 25, 2014

(30) Foreign Application Priority Data
Sep. 24, 2010 (DE) .................. 10 2010 046 394

(51) Int. Cl.
F03D 11/00 (2006.01)
G08B 5/38 (2006.01)
F03D 80/00 (2016.01)
F03D 80/10 (2016.01)

(52) U.S. Cl.
CPC .......... *F03D 11/0041* (2013.01); *F03D 80/00* (2016.05); *F03D 80/10* (2016.05); *G08B 5/38* (2013.01); *Y02E 10/72* (2013.01)

(58) Field of Classification Search
CPC ...... F03D 11/0041; F03D 80/10; F03D 80/00; G08B 5/38
See application file for complete search history.

(56) References Cited

U.S. PATENT DOCUMENTS

| 6,867,710 | B2* | 3/2005 | Wobben | .................. F21S 9/043 340/945 |
| 7,355,522 | B2* | 4/2008 | Wobben | .................. F21S 9/043 340/693.5 |
| 7,589,641 | B2* | 9/2009 | Wobben | .................. F03D 80/10 340/525 |
| 7,982,659 | B2* | 7/2011 | Laufer | ................... G01S 7/003 340/983 |

(Continued)

FOREIGN PATENT DOCUMENTS

| DE | 102 31 299 A1 | 1/2004 |
| DE | 10 348 994 A1 | 5/2005 |

(Continued)

OTHER PUBLICATIONS

Federal Aviation Administration; Advisory Ciruclar: Heliport Design; 1994; U.S. Department of Transportation.*
Translation of DE10231299; Generated 2016.*

Primary Examiner — Gregory Anderson
Assistant Examiner — Eldon Brockman
(74) Attorney, Agent, or Firm — Lazaris IP

(57) ABSTRACT

Method for operating an offshore wind farm with at least one wind turbine system and a navigation device, which is operated in a normal mode, wherein a hazard signal is received by a receiving device, the received hazard signal is supplied to a control device that switches the navigation device from the normal mode to a an emergency lighting mode.

18 Claims, 4 Drawing Sheets

(56) References Cited

U.S. PATENT DOCUMENTS

| | | | | |
|---|---|---|---|---|
| 8,482,435 B2* | 7/2013 | Wobben | ............ | F03D 80/10 315/149 |
| 8,525,663 B2* | 9/2013 | Wulff | ............ | F03D 80/10 340/500 |
| 2003/0156047 A1* | 8/2003 | Wobben | ............ | F21S 9/043 340/983 |
| 2005/0079052 A1* | 4/2005 | Wobben | ............ | G02B 6/0008 416/5 |
| 2005/0249595 A1* | 11/2005 | Wobben | ............ | F03D 80/10 416/132 B |
| 2005/0270181 A1* | 12/2005 | Wobben | ............ | F21S 9/043 340/983 |
| 2006/0051207 A1* | 3/2006 | Becerra | ............ | F03D 1/065 416/5 |
| 2009/0034259 A1* | 2/2009 | Laufer | ............ | G01S 7/003 362/253 |
| 2009/0202351 A1* | 8/2009 | Rodriguez Sola | ...... | F03D 80/10 416/146 R |
| 2009/0324383 A1* | 12/2009 | Mazur | ............ | F03D 1/005 415/4.2 |
| 2010/0156303 A1* | 6/2010 | Wulff | ............ | F03D 80/10 315/152 |
| 2010/0194603 A1* | 8/2010 | Wobben | ............ | F03D 80/10 340/983 |
| 2011/0084486 A1* | 4/2011 | Yoneda | ............ | F03D 9/005 290/44 |
| 2014/0377060 A1 | 12/2014 | Quell | | |

FOREIGN PATENT DOCUMENTS

| | | |
|---|---|---|
| DE | 10 2006 007 536 A1 | 8/2007 |
| EP | 2 199 608 A1 | 6/2010 |
| JP | 11-193774 A | 7/1999 |
| WO | WO 03/104649 A1 | 12/2003 |
| WO | 2006/092137 A1 | 9/2006 |
| WO | 2009/143849 A2 | 12/2009 |

* cited by examiner

OFFSHORE WIND FARM ILLUMINATION

CROSS REFERENCE TO RELATED PATENT APPLICATIONS

This patent application is filed herewith for the U.S. National Stage under 35 U.S.C. §371 and claims priority to PCT application PCT/EP2011/065791, with an international filing date of Sep. 12, 2011. The contents of this application are incorporated in their entirety herein.

STATEMENT REGARDING FEDERALLY-SPONSORED RESEARCH OR DEVELOPMENT

Not applicable.

TECHNICAL FIELD

The invention relates to a method of operating an offshore wind farm with at least one offshore wind energy plant and an offshore wind farm by which the method is capable of being carried out.

BACKGROUND OF THE INVENTION

Offshore wind energy plants have to be designed with a flight navigation device, in particular in a manner dependent upon their overall height. In this case a distinction is made between hazard beacons, obstruction lights and blade tip navigation lights. In addition, offshore wind energy plants have to be provided with a shipping navigation light and identification.

The aforesaid identifications are suitable only for identifying the offshore wind energy plants and the region of an offshore wind energy plant farm during the day to helicopters or ships for the purpose of entry or for allowing them to be able to avoid the offshore wind energy plant farm in the case of inadequate visibility. Not all offshore wind energy plants have to be provided with light identification for this purpose. At present it is even desired that as little light as possible should be emitted during normal operation in order to disturb birds or other animals for example as little as possible.

A flight navigation means is known from DE 10 2006 007 536 A1, which is switched on only upon specified signals and thus avoids unnecessary lighting pollution of the environment.

A problem with this reduced identification is that vehicles, in particular ships, which enter the offshore wind energy plant farm in the event of a maritime disaster or a navigation error for example, can lose their bearings in poor visibility and can maneuver in the offshore wind energy plant farm only with a serious risk of collision. Helicopters cannot fly into the offshore wind energy plant farm in poor visibility for recovery or rescue purposes without exposing themselves to serious risk on account of the rotating rotor blades, the unclear orientation of the rotors in the farm and on account of the serious risk of collision with the offshore wind energy plants.

BRIEF SUMMARY OF THE INVENTION

The object of the invention is therefore to make available a method of operating an offshore wind farm and an offshore wind farm for carrying out such a method, which will provide improved possibilities of orientation in the wind farm in the case of weather conditions with impaired visibility and/or at night.

According to the invention a method of operating an offshore wind energy plant farm is provided in that a navigation device is operated in a normal mode and a hazard signal is received by means of a receiving device in the normal mode and the received hazard signal is then delivered to a control device which switches the navigation device from the normal mode to an emergency navigation mode.

An offshore wind farm is understood in this case to refer to wind farms with one, two, three or any desired higher number of offshore wind energy plants.

A navigation device is understood in this case as being the device for the navigation lighting of the entire wind farm, which comprises individual navigation devices provided on the individual wind energy plants. In the same way, the control device comprises the central wind farm control means as well as individual control devices provided on individual offshore wind energy plants.

The navigation device preferably has a plurality of lights and floodlights. In the normal mode each of the offshore wind energy plants is operated during the day with a daytime navigation means and at night with a night navigation means. In the normal mode during the day no lights are switched on or only so few are switched on as are necessary and required for traffic safety. By way of example, a white flashing hazard beacon can be operated during daytime navigation lighting. In the night mode further lights can be switched on, and the hazard beacon can be switched over to red flashing obstruction navigation lighting during the night mode. The offshore wind energy plant can, in particular, additionally comprise a dimmer switch. The offshore wind energy plant can also have a visibility range measurement means. The measured brightness values and the measured visibility range values are supplied as measurement signals to the control device. The brightness values and/or the visibility range values are compared with stored first brightness threshold values and/or first visibility range threshold values, and in the event that a first threshold value fails to be reached by the associated measurement value the offshore wind energy plant farm or the offshore wind energy plant is switched in the normal mode from daytime navigation lighting to night navigation lighting.

With the receiving device according to the invention it is possible, in particular, for hazard signals to be received. When a hazard signal is received it is delivered as a control signal to the control device. The control device then switches the offshore wind energy plant from the normal mode to the emergency flight navigation mode preferably by day as well as by night. As compared with the normal mode, in the emergency flight navigation mode at least one additional floodlight is switched on preferably both for daytime flight navigation and for night flight navigation. When the flight navigation device is switched the normal mode to the emergency flight navigation mode it is preferable for further lights and/or path identification means also to be switched on.

In this way, the invention makes it possible for an unnecessary light emission under normal conditions to be avoided on the one hand and for the visibility conditions in the offshore wind energy plant farm to be improved in the event of an emergency in such a way that ships which have lost their bearings or have suffered a disaster can be better orientated in the offshore wind energy plant farm on the other hand. On account of the improved visibility in the offshore wind energy plant farm, rescue teams can minimize the risk of collision and can fly or travel into the offshore wind energy plant farm for rescue and recovery purposes. In addition, as a result of the improved lighting conditions the search in the wind farm for shipwrecked persons or ships in distress is simplified.

It is preferable for the receiving device to detect external hazard signals. The external hazard signals can be for example transponder signals of approaching ship[s] or aircraft. From the information on the position of the aircraft or the ship contained in the external hazard signals the control device calculates the distance from the offshore wind energy plant farm and when a minimum distance is not present it switches the flight navigation device to the emergency flight navigation mode.

Alternatively, the external hazard signal can also be a data signal which is transmitted by way of a data transmission line or a radio receiver to the at least one offshore wind energy plant or offshore wind energy plant wind farm control means. After receiving an external hazard signal the offshore wind energy plant or offshore wind energy plant wind farm control means then transmits this signal to all the other offshore wind energy plants in the offshore wind energy plant wind farm, so that their flight navigation devices are like-wise switched into the emergency flight navigation mode.

In an advantageous further development of the invention an emergency button, upon the actuation of which an external hazard signal is delivered to the offshore wind energy plant or the offshore wind energy plant wind farm control means, can be provided in or on the at least one offshore wind energy plant. In this way it is made possible for the emergency flight navigation mode to be activated not only outside the wind farm but also from inside the offshore wind energy plant wind farm or the offshore wind energy plant itself.

In a further development of the invention an active receiving device, by which the position of vehicles is detected individually, is present in the offshore wind energy plant farm, and an internal hazard signal is generated in a manner dependent upon the position, speed and/or direction of the individual vehicles when the vehicle moves directly towards the offshore wind energy plant farm or is already present inside it.

In a further development of the invention the brightness at the offshore wind energy plant or the offshore wind energy plant farm is measured by means of the at least one dimmer switch and/or the visibility range is measured by means of at least one visibility range measurement means, and the brightness of the flight navigation device and/or the number of the floodlights additionally switched on is set in the emergency flight navigation mode in a manner dependent upon the visibility range and/or brightness measured in the vicinity of the offshore wind energy plant or the offshore wind energy plant farm. The lower the measured brightness and/or visibility range, the higher the brightness of the floodlights is set in the emergency mode, at least in the pre-set brightness ranges. In this way, the brightness of the floodlights in the emergency mode is adapted to the ambient conditions and a large amount of current is not used unnecessarily.

It can also be provided that the control means compares the measured brightness values and/or visibility range values with a second threshold value in each case and in the event that the second threshold value or values is exceeded, despite a hazard signal being received, the offshore wind energy plant or the offshore wind energy plant farm is not switched into the emergency flight navigation mode.

In this way, the invention makes it possible for it to be unnecessary for the emergency flight navigation mode and thus additional flight navigation lights to be switched on when the visibility range or brightness in the offshore wind energy plant farm does not drop below the second threshold value and an additional illumination in the offshore wind energy plant farm is therefore not necessary.

In addition, it can be provided that the number of the additional floodlights and/or the brightness thereof is set in a manner dependent upon further environmental parameters such as the wind speed, temperature, wind direction, precipitation and/or wave height.

At least one additional floodlight is switched on in the emergency flight navigation mode. It is preferable for this at least one additional floodlight to be directed onto an adjacent wind energy plant or onto a surface of the water in the region of the wind energy plant on which the at least one additional floodlight is arranged. As a result, the adjacent wind energy plant is made particularly conspicuous for ships sailing into the wind farm, helicopters flying in or other vehicles, and in the second case a free area of the water surface is made conspicuous.

It is preferable for the at least one floodlight directed onto the water surface or onto the adjacent wind energy plant to be mounted in a fixed position on the tower of one wind energy plant, in order to retain its pre-set orientation onto the water surface or the adjacent wind energy plant during the tracking of the machine housing of one plant.

It is preferable for the flight navigation device to have a plurality of floodlights which are distributed over the wind farm in such a way that each individual wind energy plant is illuminated by a floodlight arranged on an adjacent wind energy plant or a wind energy plant situated at a greater distance.

In addition, floodlights are preferably arranged on the towers of the wind energy plants and are directed onto the water surface between the offshore wind energy plants in such a way that a free passage for ships between the offshore wind energy plants of the offshore wind energy plant farm is made conspicuous.

In a further embodiment of the invention the wind energy plants have arranged on them a path identification which is illuminated in the emergency flight navigation mode and which for example shows the shortest or safest path out of the wind farm in the form of arrows.

In another further development of the invention at least one of the rotor blades of one of the offshore wind energy plants of the offshore wind energy plant farm is illuminated at least locally and the illumination of the at least one rotor blade is switched on only in the emergency flight navigation mode.

In a particularly preferred further development of the invention the at least one rotor blade is translucent, and it is preferable for each rotor blade of one wind energy plant to be translucent at least locally, and it is particularly preferred for the rotor blades of the other wind energy plants of the wind farm also to be translucent at least locally in a corresponding manner. In the case of this design of the invention at least one floodlight, which shines into the interior of the rotor blade and allows the emission of light from the rotor blade at least locally on account of the local translucency of the rotor blade wall, is provided for each rotor blade on the rotor hub or in the region of the root of the rotor blade. The area which is at least locally translucent is preferably provided on the rotor tips in this case.

In an alternative further development the rotor blade is illuminated from the outside by at least one floodlight present on the associated pod. The surface of the rotor blade can be provided in this case with a particularly well reflecting coating or surface at least locally, such as for example retro-reflective foils or structures. As a result, a particularly large amount of light of the floodlights is reflected and the rotor blade is particularly easy to see.

In the emergency flight navigation mode it is preferable for each of the rotor blades to be made clearly conspicuous in a permanent manner and also in operation and independently of its current position relative to the floodlights.

In a further development of the invention lights of the wind energy plant or wind energy plants additionally already present are switched on in the emergency flight navigation mode. These can be lights on an external ladder or lights along the periphery of a loading platform for helicopters or guiding lights.

The object is attained with respect to the offshore wind farm by a wind farm with the features of claim 14. The wind farm according to the invention has a flight navigation device which is capable of being switched into a normal mode and a receiving device for a hazard signal, in which case it is possible for the hazard signal received to be delivered to a control device which switches the flight navigation device from the normal mode to an emergency flight navigation mode.

Externally emitted hazard signals can be the transponder signal of aircraft or ships, but also acoustic signals, such as the foghorn of a ship. In contrast to the normal mode, flood-lights and lights are additionally switched on in the emergency flight navigation mode in order to make the individual wind energy plants clearly recognizable.

With respect to the definition of the term, reference is made to what was stated concerning the method. In particular, an individual offshore wind energy plant is also understood in this case as being a wind farm.

A flight navigation device is understood as being an overall device for the navigation lighting of the entire wind farm, which comprises individual flight navigation devices pro-vided at the individual wind energy plants. In the same way, the control device comprises the central wind farm control means as well as individual control devices provided on individual offshore wind energy plants.

The receiving device can comprise a dimmer switch for measuring brightness values as a hazard signal and/or a visibility range measurement means which measures the brightness as a hazard signal. It is provided according to the invention that the receiving device should be designed in the form of a detection unit, for example in the form of a receiver for externally emitted hazard signals, for example a vehicle identification inter alia or in the form of an emergency button for manual actuation for shipwrecked persons who have disembarked.

The receiving devices can be provided on any individual offshore wind energy plant or only on one of the offshore wind energy plants and/or at particular locations of the offshore wind energy plant farm. In particular, the receiving devices can be designed in a redundant manner. The entire flight navigation device of the wind farm is capable of being operated by an emergency supply system even in the event of failure of the electrical supply system.

Alternatively, the external hazard signal can also be a data signal which is transmitted by way of a data transmission line to the at least one individual control device of the offshore wind energy plant or the offshore wind energy plant wind farm control device. After the receipt of an external hazard signal the individual control device or offshore wind energy plant wind farm control device then transmits this signal to all the other offshore wind energy plants in the offshore wind energy plant wind farm, so that the individual flight navigation devices thereof are switched into the emergency flight navigation mode.

The flight navigation device can comprise individual flight navigation devices of the individual offshore wind energy plants. The flight navigation device can additionally pro-vide floodlights and/or lamps on the machine housing and/or on the tower and/or the access platform of one or more or all of the offshore wind energy plants of the wind farm.

BRIEF DESCRIPTION OF THE SEVERAL VIEWS OF THE DRAWINGS

The invention is described in four Figures with reference to three embodiments. In the Figures.

DETAILED DESCRIPTION OF THE INVENTION

Figure 1:
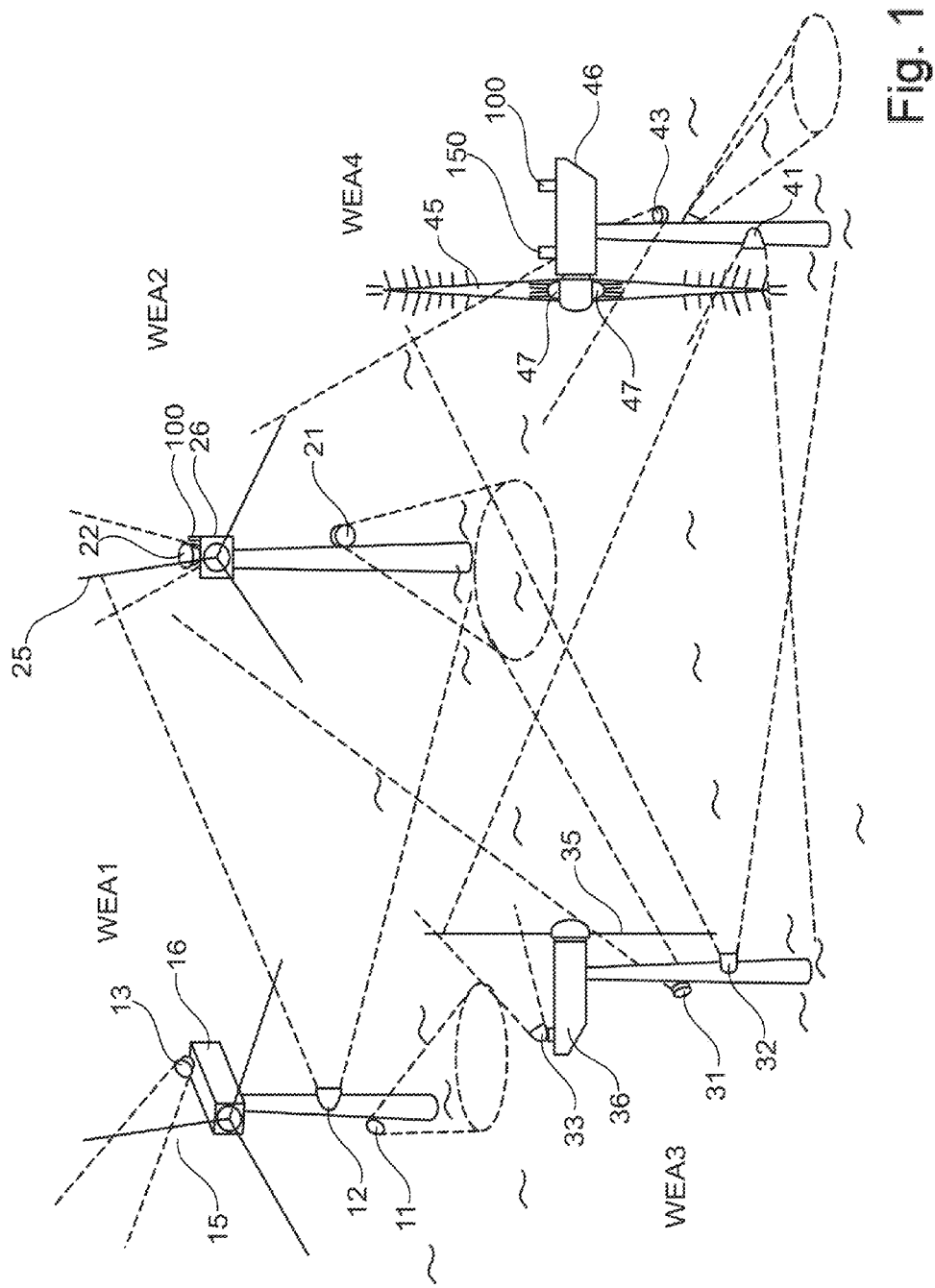
FIG. 1 is a diagrammatic view of a switched-on flight navigation device of an offshore wind farm.

FIG. 1 shows a wind farm with four wind energy plants OWEA 1, OWEA 2, OWEA 3, OWEA 4. The invention extends, however, to offshore wind energy plant farms and also onshore wind farms with any desired number of wind energy plants. It is possible for two, three and any desired higher number of structurally similar or different wind energy plants to be provided. Each of the wind energy plants OWEA 1, OWEA 2, OWEA 3, OWEA 4 has a tower, a rotor with three rotor blades 15, 25, 35, 45 in each case and a machine housing 16, 26, 36, 46.

The wind energy plants OWEA 1, OWEA 2, OWEA 3, OWEA 4 have in each case one flight navigation device with at least one floodlight 11, 12, 13, 21, 22, 31, 32, 33, 41, 42, 43, 47 in each case. The flight navigation devices are designed differently. The first flight navigation device of the first wind energy plant OWEA 1 has a first floodlight 11 directed onto a surface of the sea inside the wind farm and a second floodlight 12 directed onto the second wind energy plant OWEA 2. In addition, the first flight navigation device has a floodlight 13 which is arranged on an end of the first machine housing 16 facing away from first rotor of the first wind energy plant OWEA 1 and which is directed onto an area above the first machine housing 16 and thus backlights in each case one of the first blades 15 of the first rotor sweeping past.

The second wind energy plant OWEA 2 has a floodlight 21 which is arranged on the tower thereof and which is directed onto the surface of the sea in the region of the tower, as well as a second floodlight 22 at the rear area of the second machine housing 26 facing away from the second rotor, which is likewise directed onto an area above the second machine housing 26 and which backlights in each case one of the second rotor blades 25 sweeping past.

OWEA 3 has two floodlights 31, 32 which are arranged on the tower thereof and the first floodlight 31 of which is directed onto the second wind energy plant OWEA 2 and the other floodlight 32 of which is directed onto the fourth wind energy plant OWEA 4. In this case the floodlights 31, 32 are directed onto the wind energy plants OWEA 2, OWEA 4 in such a way that the wind energy plants OWEA 2, OWEA 4 are illuminated along their entire height.

A third floodlight 33 is mounted on the roof of the third machine housing 36 of the third wind energy plant OWEA 3 on a part facing away from the associated rotor and it is directed from there onto the rotor blades 35 of the same wind energy plant OWEA 3. Alternatively or in addition, the third machine housing 36 can have laterally arranged on it floodlights (not shown) which illuminate an area at the side of the third machine housing 36 and, in this way, backlight the blades 35 of the third rotor sweeping past in each case at the side of the third machine housing 36.

OWEA 4 likewise has three floodlights 41, 42, 43 arranged on the tower thereof. The first floodlight 41 is directed onto OWEA 2 and illuminates it, the second floodlight 42 is directed onto OWEA 3 and illuminates it, and the third floodlight 43 is directed onto an area of the surface of the sea between OWEA 3 and OWEA 4. In contrast to the illumination of the rotor blades 15, 25, 35 of OWEA 1, OWEA 2 and OWEA 3, the rotor blades 45 of OWEA 4 comprise a translucent wall material, so that the three floodlights 47 illuminating the three interiors of the three rotor blades 45 light up each of the three rotor blades 45 and thus reveal the hazard situation. The wind farm according to FIG. 1 is shown in the emergency flight navigation mode.

Figure 3A:
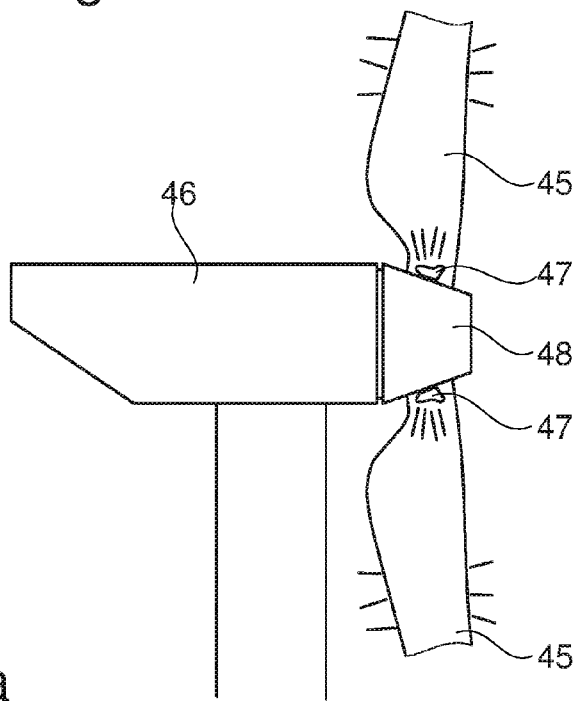
FIG. 3a shows an interior illumination of an inner blade of the rotor.

In FIG. 1 the flight navigation device of the wind farm comprises floodlights 11, 12, 13, 21, 22, 31, 32, 33, 41, 42, 43, 47 arranged inter alia on the towers or the roofs of the machine housings 16, 26, 36, 46 as well as the floodlights 47 provided in OWEA 4 for the internal illumination of the rotor blades 45. Any desired combinations of the described illumination arrangements of the individual wind energy plants OWEA 1, OWEA 2, OWEA 3, OWEA 4 are possible. Further lights or floodlights, in particular as shown in FIGS. 3 and 4 and as discussed later, are possible as part of the flight navigation device, which are capable of being switched on in the emergency flight navigation mode.

Figure 2:
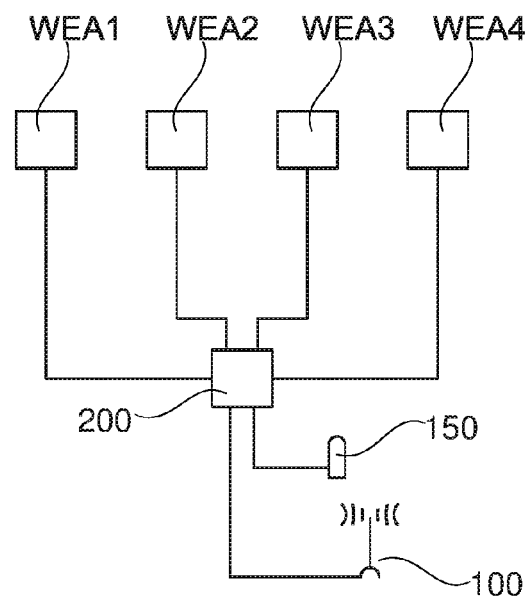
FIG. 2 shows the basic circuitry of the flight navigation device.

FIG. 2 shows the basic circuitry of the flight navigation device of the wind farm. Basically the flight navigation device of the offshore wind energy plant farm as a whole and of each individual offshore wind energy plant is switched into the normal mode during the day and also during the night. The normal mode is referred to as day mode during the day and as night mode during the night. In the normal mode all the floodlights 11, 12, 13, 21, 22, 31, 32, 33, 41, 42, 43, 47 are switched off both during the day and during the night. In the normal mode a hazard beacon or obstruction light and/or a blade tip navigation device is switched on in a manner dependent upon the safety standards and the type of authorization which depend in particular upon the height of the wind energy plants OWEA 1, OWEA 2, OWEA 3, OWEA 4 and their location. Hazard beacons have a light intensity of more than 1=2,000 cd, whereas the light intensity of obstruction lights is approximately only at least 1=10 cd.

As a rule, in the normal mode white flashing lights are switched on during the day and red flashing lights are switched on during the night. In this case "during the day" means a degree of brightness in the vicinity of the wind farm which exceeds a specified threshold brightness threshold value, and "during the night" a degree of ambient brightness of which does not reach the threshold brightness threshold value.

In order to determine the brightness in the offshore wind energy plant farm as a whole, in this embodiment the fourth wind energy plant OWEA 4 has provided on it a dimmer switch 150 which acts upon a control device 200 of the flight navigation device with brightness measurement values. If a first threshold value is exceeded, the control device 200 switches the offshore wind energy plants or the offshore wind energy plant farm from the night mode to the day mode, and if it is not reached it switches it from the day mode to the night mode again.

The flight navigation device also has a receiving device 100 which responds to an external hazard signal. The receiving device 100 can comprise either only one individual detector or a plurality of detectors, i.e. two or more, which are arranged in each case on a wind energy plant OWEA 1, OWEA 2, OWEA 3, OWEA 4. The external switch-on signal is for example a transponder signal of an aircraft or ship or another external signal. It can also be the noise of the engines of an approaching ship. The receiving device 100 acts upon the control device 200 with the external signal converted into an electrical signal and switches the flight navigation device from the normal mode to the emergency flight navigation mode. In this case the floodlights 11, 12, 13, 21, 22, 31, 32, 33, 41, 42, 43, 47 described above and illustrated in FIG. 1 are preferably all switched on or switched on in part in a manner dependent upon the ambient brightness.

After the hazard signal has been received and before the emergency flight navigation mode has been switched on a matching with the brightness value of the environment of the offshore wind energy plant farm constantly measured by the dimmer switch 150 is carried out in the control device 200. In this case the brightness and the number of the floodlights switched over to the emergency flight navigation mode is adjusted to the brightness measured. The darker the environment, the greater the brightness of the floodlights switched over. In a corresponding manner, the number of the floodlights switched over to the emergency flight navigation mode is greater.

A second brightness threshold value is fed into the control device 200, and in the event of its being exceeded the offshore wind energy plant farm is not switched to the emergency flight navigation mode despite a hazard signal being received.

In the emergency flight navigation mode the obstructions in the form of the wind energy plants OWEA 1, OWEA 2, OWEA 3, OWEA 4 for ships sailing or aircraft or helicopters flying inadvertently or deliberately into the wind farm are made conspicuous.

FIG. 3 shows an arrangement in each case of a floodlight 47 in the region of the rotor hub 48 of each of the three rotor blades 45 of OWEA 4 in FIG. 1. The floodlights 47 illuminate the interiors of each of the three rotor blades 45. Walls of the three rotor blades 45 are made translucent at least locally, it being preferable for the walls of the three rotor blades 45 to be made translucent in the region of the blade tips. In addition, the three rotor blades 45 can be provided with a transparent coating, for example a glass coating, reflectors or a blade tip navigation light. The arrangement of the floodlights 47 allows the three rotor blades 45 to be identified as a hazard in an optimum manner in the emergency flight navigation mode.

Figure 3B:
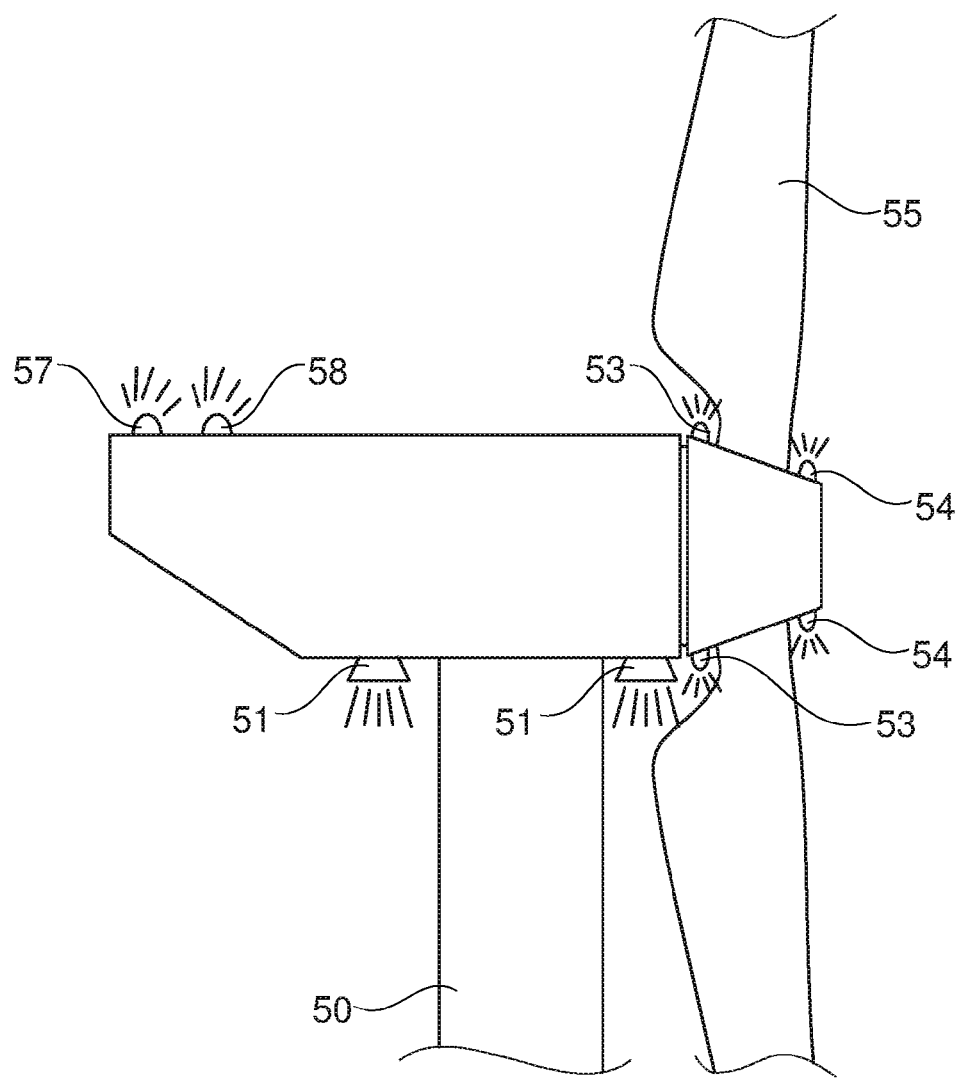
FIG. 3b shows an exterior illumination of an offshore wind energy plant.
Figure 4:
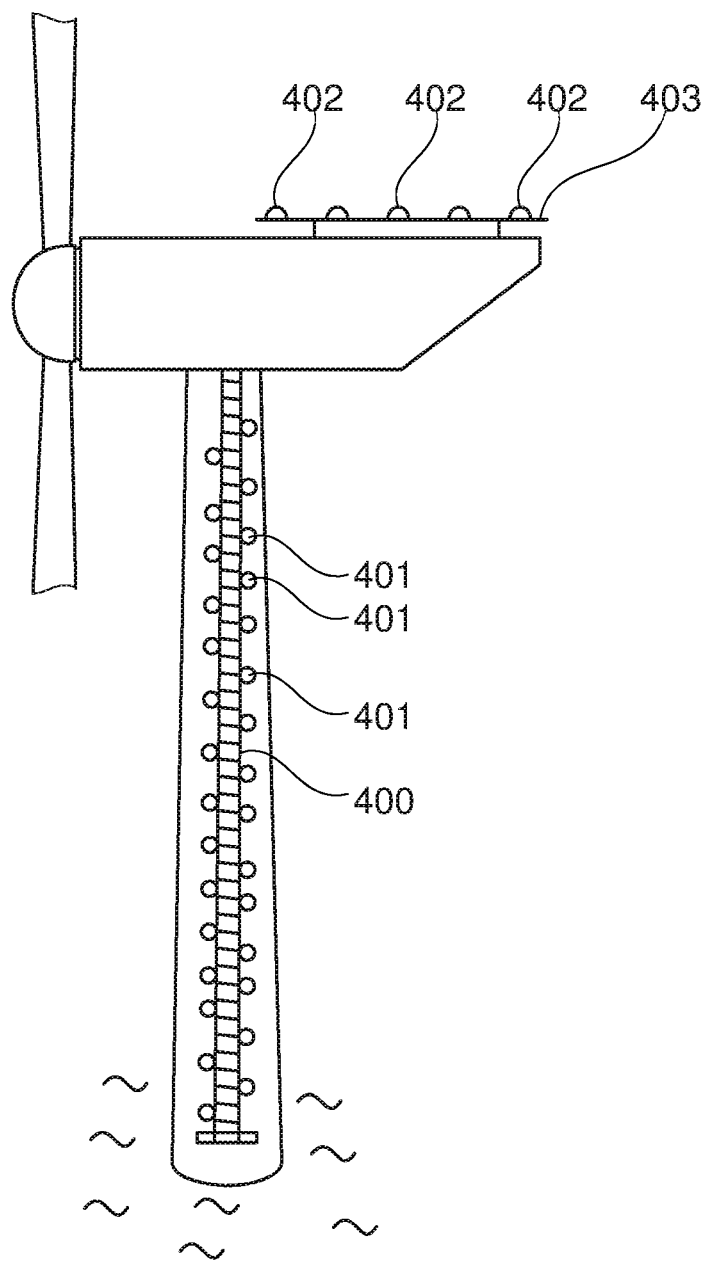
FIG. 4 shows lights of a wind energy plant of a wind farm.

FIG. 3b shows an arrangement according to the invention of the floodlights 51, 53, 54—capable of being additionally switched on in the emergency flight navigation mode—of one of the wind energy plants OWEA 1, OWEA 2, OWEA 3, OWEA 4 in a further embodiment of the invention. In this case, the tower 50 has arranged adjacent to it on the base of the machine housing towards the sea on opposite sides of the tower 50 in each case a floodlight 51, which is provided for illuminating the associated tower 50 as well as for illuminating the basic structure (not shown) of the wind energy plant OWEA 1, OWEA 2, OWEA 3, OWEA 4 on the sea bed. In addition, a floodlight 54, which is orientated in the longitudinal direction of the rotor blade 55 and which illuminates the side of the rotor blade 55 facing away from the tower, is arranged on the side of each rotor blade 55 facing away from the tower, and a floodlight 53 is arranged in each case on the side of the rotor blade 55 facing the tower in order to illuminate the side of each rotor blade 55 facing the tower.

In addition, FIG. 3b shows the daytime navigation light and night-time navigation light—arranged on the end of the machine housing 56 facing away from the rotor—in the form of an obstruction light 57 and a hazard beacon 58. The obstruction light 57 comprises a white flashing light and the hazard beacon 58 a red flashing light. The wind energy plant illustrated in FIG. 3b can replace one, a plurality or all of the wind energy plants OWEA 1, OWEA 2, OWEA 3, OWEA 4, which are illustrated in FIG. 3a, and combinations of the floodlight arrangements of the various types are also possible. FIG. 4 shows ladder lights 401 which are usually provided on offshore wind energy plants OWEA 1, OWEA 2, OWEA 3, OWEA 4 and which are provided along a ladder 400 attached on the outside of the tower of the wind energy plants OWEA 1, OWEA 2, OWEA 3, OWEA 4, as well as landing lights 402 which are provided along the periphery of a helicopter landing pad 203 on the roof of the wind energy plants OWEA 1, OWEA 2, OWEA 3, OWEA 4. The flight navigation device comprises the ladder lights 401 and the landing lights 402. In the emergency flight navigation mode some or all of the lights 401, 402 are switched on, in order to generate a constantly radiating light and/or flashing lights or any other possible pulse sequence.

LIST OF REFERENCES 11 floodlight
12 floodlight
13 floodlight
15 rotor blades
16 machine housing
21 floodlight
22 floodlight
25 rotor blades
26 machine housing
31 floodlight
32 floodlight
33 floodlight
35 rotor blades
36 machine housing
41 floodlight
42 floodlight
43 floodlight
45 rotor blades
46 machine housing
47 floodlight
48 rotor hub
60 tower
51 floodlight
53 floodlight
54 floodlight
55 rotor blade
56 machine housing
57 obstruction light
58 hazard beacon
100 receiving device
150 dimmer switch
200 control device
203 helicopter landing pad
400 ladder
401 ladder lights
402 landing lights
OWEA 1 wind energy plant
OWEA 2 wind energy plant
OWEA 3 wind energy plant
OWEA 4 wind energy plant

What is claimed is:

1. A method of operating an offshore wind farm, comprising:
providing, at least one offshore wind energy plant, a flight navigation device which is operable in a normal mode;
receiving a hazard signal at a receiving device;
delivering the received hazard signal to a control device; and
switching the flight navigation device from the normal mode to an emergency flight navigation mode so that at least one floodlight on a machine housing is switched on and illuminates rotor blades of the wind energy plant associated with the machine housing, and one or both of at least one floodlight which radiates onto the surface of the sea is switched on, and at least one floodlight on the machine housing of a wind energy plant is switched on to radiate a further wind energy plant.

2. A method according to claim 1, further comprising switching on an additional floodlight in the emergency flight navigation mode.

3. A method according to claim 2, characterized in that the emergency flight navigation mode is switched on until the hazard signal is either no longer detected or a pre-set time has been exceeded since detection of the hazard signal.

4. A method according to claim 3, further comprising measuring at least one of brightness values and visibility range values in the environment, and delivering measured values representing the at least one of the brightness values and the visibility range values to a control device, wherein at least one of a degree of brightness, a number of floodlights, or a number of lights switched on in the emergency flight navigation mode are adapted to either the measured degree of brightness or the measured visibility range values in such a way that the higher the measured values, the lower the degree of brightness, the lower the number of floodlights switched on, and the lower number of lights are switched on.

5. A method according to claim 4, characterized in that the receiving device receives an externally emitted hazard signal and transmits an internal hazard signal to all the wind energy plants of the wind farm, and the flight navigation devices associated with the wind energy plants are switched from the normal mode into the emergency flight navigation mode.

6. A method according to claim 5, characterized in that lights that are switched on in the normal mode are further operable in the emergency flight navigation mode.

7. A method according to claim 6, characterized in that at least one floodlight in a rotor hub is switched on, the at least one floodlight radiating into an interior of a rotor blade, the rotor blade being provided with a wall which is translucent at least in part.

8. A method according to claim 6, characterized in that at least one floodlight in a rotor hub is switched on, the at least one floodlight radiating into an interior of a rotor blade, the rotor blade being provided with a wall which is translucent at least in part.

9. A method according to claim 6, characterized in that in the emergency flight navigation mode, all of the floodlights attached on an outside of the wind energy plant are switched on in addition to the normal mode.

10. A method according to claim 9, characterized in that at least one of the lights or guiding lights that are arranged on a ladder, a landing platform, and a wind energy plant are switched on.

11. A method according to claim 10, characterized in that a daytime navigation light is additionally switched on.

12. A method according to claim 11, characterized in that the illuminated guiding lights show a shortest way to an exit of the wind farm are arranged on a wind energy plant and are switched on.

13. A method according to claim 1, characterized in that a central control device of a wind energy plant in the wind farm sends a signal concerning switching on the emergency flight navigation mode to a remote monitoring unit.

14. An offshore wind farm for operating at least one wind energy plant, comprising:
    a flight navigation device which is capable of being operated in a normal mode, having a receiving device for receiving a hazard signal; and
    a control device to which the hazard signal is capable of being delivered and which switches the flight navigation device from the normal mode into an emergency flight navigation mode when the hazard signal is delivered and by at least one floodlight arranged on a tower of a wind energy plant and capable of being directed onto the surface of the sea and by at least one additional floodlight arranged on the tower of the wind energy plant and capable of being directed onto an adjacent wind energy plant.

15. An offshore wind farm according to claim 14, characterized by at least one dimmer switch and visibility range measurement device for determining measurement values supplied to the control device, wherein the control device adapts one or more of a brightness, a number of floodlights and a number of lights that are switched over to the emergency mode to at least one of a measured brightness and a measured visibility range in such a way that the higher the measurement values, the lower the brightness, the lower the number of the floodlights and the lower the number of lights switched over.

16. An offshore wind farm according to claim 15, characterized in that at least one rotor blade has a translucent wall, and a floodlight is arranged on a hub of the rotor blade and is directed into an interior of the rotor blade.

17. An offshore wind farm according to claim 15, characterized in that at least one rotor blade has a translucent wall, and a floodlight is arranged on a hub of the rotor blade and is directed into an interior of the rotor blade.

18. An offshore wind farm according to claim 15, characterized in that the flight navigation device has lights positioned on either a ladder or a landing platform, and guiding lights, wherein each of the lights and the guiding lights are capable of being switched on separately or in combination in the emergency flight navigation mode.

* * * * *